Patented May 20, 1952

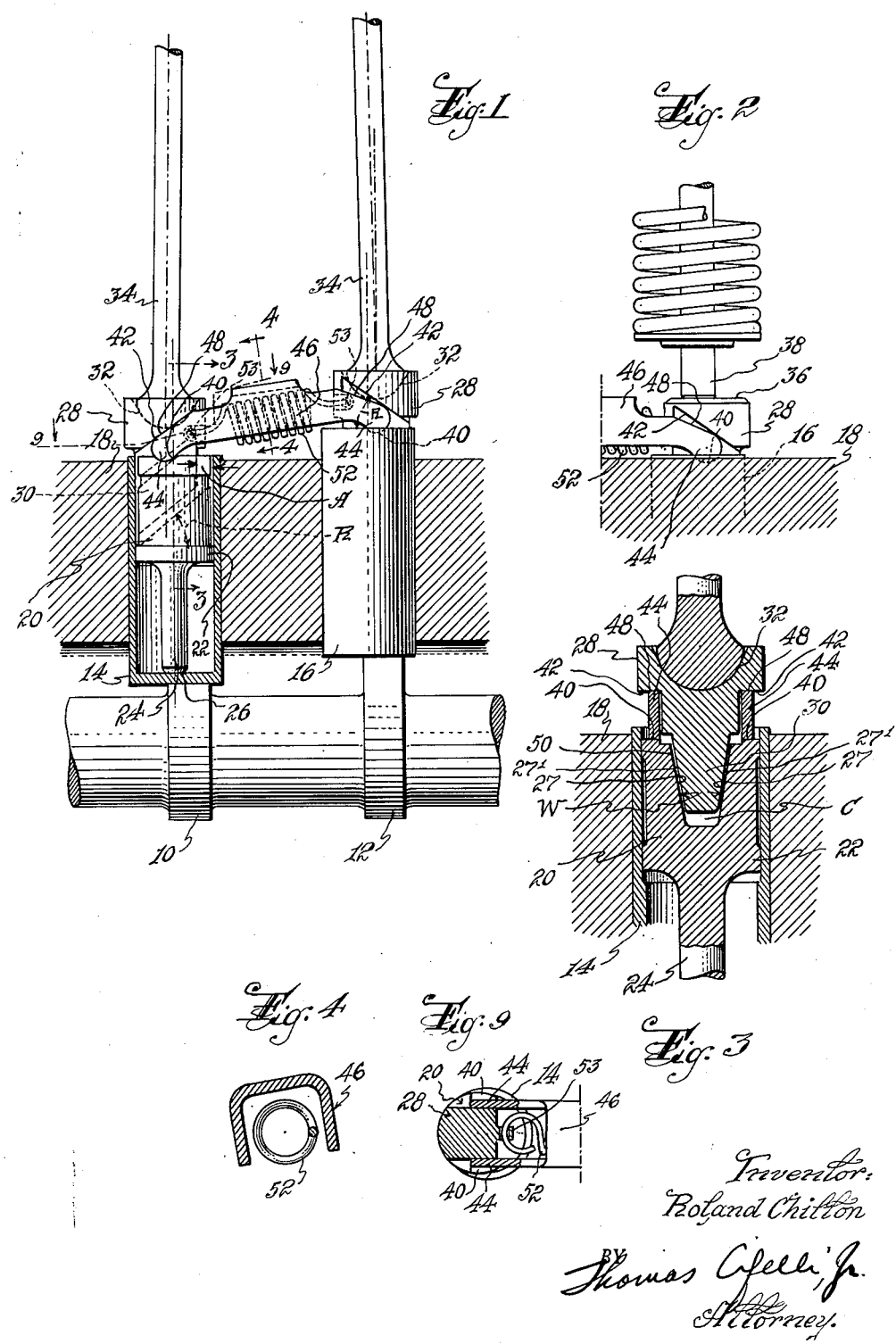

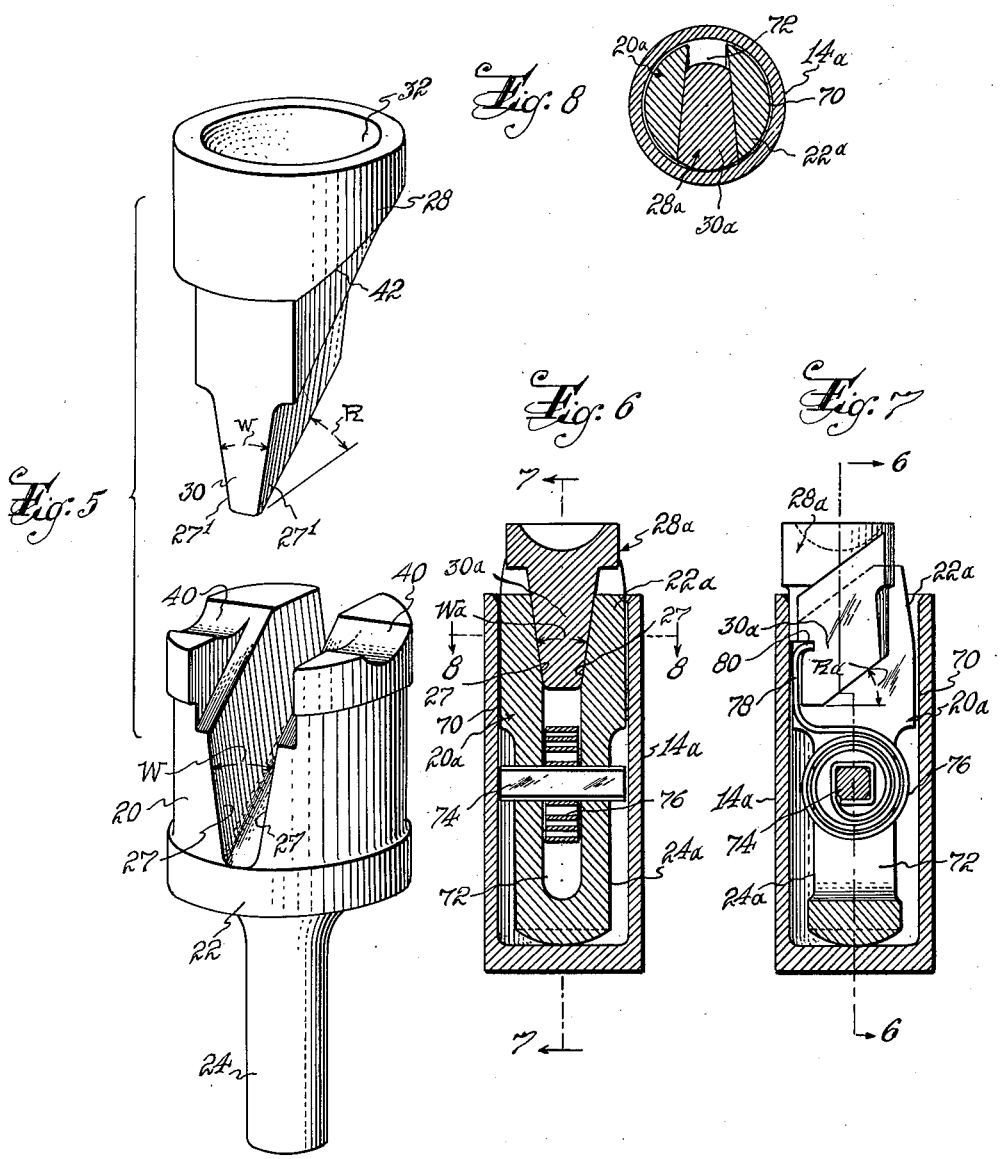

2,597,618

UNITED STATES PATENT OFFICE 2,597,618

AUTOMATIC ADJUSTING TAPPET

Roland Chilton, Glen Rock, N. J.

Application March 25, 1950, Serial No. 151,901

21 Claims. (Cl. 123—90)

This invention relates to means for automatically adjusting an operating clearance to compensate for clearance affecting factors such as wear, expansion and contraction of the parts, the specific embodiments of the drawings showing valve tappets (also called cam followers or valve lifters).

An object of the invention is to provide effective novel means having few parts, suited for economic mass production. Another object is to provide a mechanism free from parts dependent on delicate operating forces or close fits which are liable to become inoperative from sticking, especially from gum or sludge deposits due to oxidation or other deterioration of the lubricant in service.

A further object is to provide a self-adjusting tappet unit usable as a replacement, and/or as new, equipment interchangeably with conventional camshafts, tappet guides and valves or push rods.

In operation, valve mechanisms are subject to slow increase in clearance from wear but also to relatively rapid increase and decrease in clearance with the expansion and contraction of the parts due to changes in operating temperatures. Thus, in certain engines, if the tappets should be adjusted to close "hot" clearance, the "cold" clearance, after an inoperative period, may be negative by many thousandths of an inch. This holds the valves off their seats when they should be closed, which makes restarting the engine difficult or impossible. Accordingly, another object of the invention is to provide means whereby the automatic adjustment will restore the mechanism to a desired clearance quickly as the engine is turned over for starting.

The general objectives of automatic tappets are well known; e. g. to avoid the cost and inconvenience of the periodic servicing of manual adjustments which are necessary to correct objectionable valve noise from increased clearances due to wear. Of course, no manually-adjusted tappet can correct for the clearance variations which occur with changes of temperature while the engine is in operation. Automatic maintenance of near-to-zero clearances is especially desirable in high speed and/or push rod and rocker arm valve gears and has become an essential in automobile engines which may accelerate to high rotational speeds with the vehicle moving slowly, as in the case with many torque-converter fluid type transmissions.

According to this invention these objectives are achieved by the use of a novel compound-wedge adjusting member.

The tappet has a ramp so steep that the adjusting member would slide down the ramp to wide clearance under valve actuating loads if the ramp engagement were on plane surfaces. However, according to this invention the ramp is of V or wedge cross-section whereby the adjusting member is normally self-locking against sliding down the ramp under valve operating loads. At the same time should the mechanism acquire clearance (when the valve is on its seat) then the adjusting compound-wedge is relieved of valve actuating load and there is no reaction force to produce the wedging action and the compound-wedge adjusting member is accordingly free to slide up the ramp to bring the parts to zero clearance. Spring means are provided so to urge the wedge up the ramp. It is a feature of the present invention that this means may comprise a substantial spring exerting a much greater force than tolerable with a plane-surface simple wedge and therefore the wedge is much less liable to become "gummed up" as will be clear from the following:

A simple plane-surface wedge must have a very slight ramp slope angle in order to be "irreversible" i. e. to prevent the wedge from slipping under valve-operating loads. Such a wedge requires a light spring because its great mechanical advantage endangers wedging of the valve off its seat, should a substantial spring be used. Such a conventional plane wedge also involves a relatively great wedge travel for a small adjustment, which is difficult to provide for in the space available in conventional tappets. On the other hand, the ramp angle in the present invention may be much greater than the slipping angle of a plane wedge because of the great friction effect from the wedge-form cross-section of the ramp. This alone would permit of a heavier-than-normal take-up-spring and this advantage is further greatly enhanced by the additional wedging action of the compound-wedge which in engineering terms is of very "low efficiency," i. e. most of the spring force multiplication, due to the ramp angle, is lost in friction at the wedge-form contact, leaving but a small component tending to unseat the valve. This component must be kept substantially below the seating load of the valve spring, and is so kept in accordance with my invention as above stated.

In a preferred embodiment, automatic resetting of the clearance after each valve cycle is obtained as follows: In addition to its main wedge-form surfaces, the adjusting wedge member is provided with a land (shoulder) or lands having substantially the same slope as the ramp, but in transverse section comprising a plane surface, i. e., one having no compound-wedge effect. As stated above the ramp angle is such as would cause a plane wedge to slip under operating loads, which is what occurs when the wedge is supported from said plane lands. This is achieved once per valve cycle while the valve is on its seat as follows:

Conventional engines have inlet and exhaust valve tappets arranged adjacently in pairs and the inlet valve reaches the top of its lift while the exhaust valve is seated (tappet on the neutral or non-lift arc of the cam) and vice versa. I provide a resetting or relief lever, spanned between the pair of tappets the ends of which lever are so profiled as to engage the plane lands of one tappet-adjusting wedge as the other end of the lever is raised by the other tappet to the top of its lift. Thus, any load on the compound-wedge surfaces is transferred to the lever contact with the plane lands thereby tending to unseat the wedge-form surfaces and instantaneously converting the self-locking compound-wedge to a simple wedge of high ramp angle which promptly slides down the land ramp to the relief of any negative clearance. As the companion tappet descends from its valve open position, the lever follows, thus disengaging the land, whereupon the follow-up spring urges the adjusting wedge up the wedge-form ramp to zero clearance as stated. Because the friction losses in the compound-wedge are so high a relatively strong spring is able to exert but small unseating pressure on the valves.

It is a feature of this invention that this relief and resetting action is through a stiff and power-operated lever capable of forcibly freeing the parts at each cycle thus preventing "gumming up" from sludge accumulation.

The wedge angle of the wedge-section ramp is in itself greater than the "sticking" angle, that is to say the wedge is freed to slide under spring force acting substantially along the ramp whenever it is relieved of valve actuating loads, but, nevertheless it is an important feature of this invention that the compound-wedge is self-locking under loads applied at substantial angles to the ramp, as are the valve lifting loads. In other words the slipping ramp angle on a ramp of wedge-section is much greater than that for a plane-surfaced ramp, notwithstanding that the wedge-angle itself is greater than the jamming angle and this is of the essence of an important phase of this invention.

In the drawings:

Fig. 1 is a side view of a pair of tappets with one tappet and the tappet guide in section, shown as operating a conventional valve push rod;

Fig. 2 is a fragmentary side view illustrating my tappet operating a conventional valve stem;

Fig. 3 is a fragmentary section through the line 3—3 of Fig. 1;

Fig. 4 is a fragmentary section on the line 4—4 of Fig. 1;

Fig. 5 is an "exploded" isometric view further illustrating the compound-wedge construction of this invention;

Fig. 6 is a section on the line 6—6 of Fig. 7 illustrating a modification of the invention;

Fig. 7 is a section on the line 7—7 of Fig. 6 with the wedge shown in outside view;

Fig. 8 is a section on the line 8—8 of Fig. 6; and

Fig. 9 is a fragmentary section on the line 9—9 of Fig. 1, further showing the attachment of the spring to the wedge.

In Fig. 1 conventional inlet and exhaust cams are illustrated at 10 and 12, the former being shown with the tappet unlifted, the valve (not shown) being in its closed or seated position, while the latter shows the cam and tappet in the lifted position.

Tappet shells 14 and 16 reciprocate in a conventional tappet-guide member 18 and engage the cams 10 and 12 as usual. The left hand tappet shell 14 is shown in section to expose the ramp member (20) having a generally circular head 22 and a stem 24 engaging the base of the tappet shell 14, at 26, so as to permit the shell 14 to spin under the action of the conventionally offset cam 10. In Figs. 3 and 5 the ramp member is seen to comprise a wedge slot of wedge angle W having sides 27 and disposed on a ramp slope angle R (Fig. 1). Engaged with the wedge slot W of the ramp member 20 is a compound-wedge adjusting member 28 having the wedge 30 conformed in cross section to the wedge angle W, and disposed at the ramp angle R, the wedging contact occurring on the surfaces 27, 27' and 27, 27'. A clearance C (Fig. 3) is provided between the bottom of the ramp slot and the wedge. The top of the compound adjusting wedge 28 is provided with the usual socket 32 in the case of a valve gear having push rods 34 (Fig. 1) but has a flat surface 36 in the case where a valve stem 38 is operated directly (Fig. 2).

The ramp member 20 is provided with lever abutments 40 and the wedge member 28 is provided with plane (non-wedge) ramp surfaces or abutments 42 conformed to the ramp angle R. Disposed between these abutments 40 and 42 are the ends 44 of a rocking lever 46 spanned between the pair of tappets. In Fig. 1 it will be seen that the lever ends 44 have upper ramp surfaces 48 which engage the plane ramp 42 of the unlifted adjusting wedge and clear the shoulder 42 of the lifted adjusting wedge. This contact of the lever ramp 48 with the plane ramp 42 of the compound-wedge adjusting member, transfers any residual valve loads from the wedge surfaces W (27, 27') to be borne by the plane ramp 42. The ramp angle R is well beyond the limiting friction angle or angle of repose, so that the adjusting wedge 28, while engaged by the lever ramp 48 is incapable of supporting any valve operating load, whereunder the wedge 28 would immediately be slid down the lever ramp 48 (left-ward in the case of the left hand tappet 14 Fig. 1).

To clearly illustrate this unwedging or resetting action of the lever 46 the wedge 30 is shown in Fig. 3 as having a substantial clearance 50 at this point of the cycle. In practice however the compound adjusting wedge will never actually develop such clearance because as soon as most of any residual valve load is transferred from the wedge surfaces W (27, 27') to the plane lever-ramp 48 the adjusting wedge 28 will immediately slide down the lever ramp 48 until any such residual load is relieved. Since the angle of ramp 48 of the resetting lever is parallel to the ramp angle R of the wedge this sliding involves no substantial wedge clearance 50.

The adjusting wedges 28 are continuously urged to the zero clearance condition by a tension spring 52, hooked between them as shown at 53 in Figs. 1 and 9, the spring 52 being disposed within the inverted U section of the lever illustrated in Fig. 4. If desired, a compression spring can be employed in place of the tension spring 52.

In such case, the tappets would be arranged so that the compression spring pushes the wedge member up the ramp instead of pulling it up, i. e., the tappets would be turned 180° from the positions shown in the drawings.

It will be seen that the resetting action by the lever 46 occurs on each valve tappet while it is in the valve-closed position, where the parts will be usually free of load (except when a less-than-zero or negative clearance has occurred) and that the resetting occurs as the companion tappet is completing its lift. This provides a firm and powerful releasing or unwedging action on the neutral part of each cycle by rigid means independent of any spring action. This will continuously prevent the parts from becoming stuck as from lubricant gum.

With the proportion shown between the ramp angles R and the wedge angles W the compound-wedge 28 is intended to be self-locking against sliding down the ramp under any load that can be applied axially by a push rod 34 or valve stem 38, but the adjusting wedge will slide down the ramp freely each time contact is established at the plane (non-wedged) lever ramp contact 48—42. It is the co-action of the wedge and ramp angles W and R which provides the self-locking action herein. The angles may be changed from those shown, but in general as the ramp is steepened the wedge will need to be more acute. As stated later, such acuteness should not be carried to the point where the wedge considered alone would jam or stick into the ramp member when forced therein.

A slight over-travel is provided at the releasing contact 48—44 when the lever attains its maximum angle and it is a feature of this invention that this overtravel does not change with wear in the rest of the valve mechanism. This results from the parallelism or equal ramp slope of the compound wedge W and the plane-relieving abutments 42 as shown in Fig. 1.

The total lateral adjustment available for the wedge is indicated at A Fig. 1 and, with the ramp slope shown, the resulting vertical adjustment range will be about one half this amount. These relatively great adjustment ranges however in no way change the slight overtravel or interference relation between the resetting ramps 42—48 of the adjusting wedge and lever. If on the other hand it were attempted to reset the wedge by thrusting it horizontally from a resetting lever it will be seen that the lever contact clearance or interference would vary by the large dimension A which would render the device inoperative or excessively noisy.

As has been said a tappet with a steep ramp angle R would be inoperative with a conventional plane-surfaced wedge, which would slip down the ramp to maximum valve clearance on each attempt to lift the valve. In this invention however the relatively acute wedge angle W comprising the compound-wedge renders the wedge self-locking under any valve actuating load. It can be said in short that the construction shown provides a non-slipping compound-wedge while the valve is being opened and shut which is transformed to a plane or simple self-releasing wedge by the lever 46—48 when the valve is on its seat.

The high ramp angle permitted by this novel compound-wedge construction also permits relatively great valve adjustment range with much smaller travel (A) along the ramp than would be possible with a plane or simple wedge, which would have to have a ramp angle flatter than e. g. one-in-ten to prevent slipping of the wedge under the normal flood lubrication. As stated, the ramp-ratio shown is about one in two permitting the compound-wedge to be disposed within the bore of a tappet shell 14 of conventional size. It will also be seen that the adjustment clearance A Fig. 1 detracts little from the length of the wedge which accordingly has great surface contact area, as desired for durability and especially to prevent the deterioration known as "scuffing" or "fretting."

This short adjustment travel also facilitates the provision of a robust resetting spring 52 having little change in load over the adjustment range, while the disposition of the spring and lever to serve a pair of tappets reduces the number of parts and brings these members to a place where there is usually plenty of room in conventional engines, for robust design. This design utilizes conventional tappet shells 14—16 and push rods 34 or valves 38, while eliminating the usual valve adjusting screw and lock nut of the simple manually adjusted tappets. The added parts per tappet are the ramp member 20, the compound adjusting wedge 28 and one half each of the lever 46 and the spring 52, i. e. three parts added and two deleted thus achieving an automatic tappet having only one more part than the conventional manually-adjusted tappet and many less parts than in any automatic tappet of which I am aware.

One of the features of this invention is that the resetting range, i. e., the amount the adjusting wedge may slide down its ramp towards the maximum clearance position shown in Fig. 1 is independent of the amount of over-travel or interference provided between the lever ramp 48 and the unseating ramp land 42 of the wedge. As soon as these ramps attempt to take any residual valve load (due to negative clearance) off the wedge surfaces W, the slipping condition is established and the wedge could slide down the ramp to its extreme clearance position, without further movement of the lever, if an exorbitant amount of negative clearance had occurred. In actual operation the negative clearance acquired per cycle is microscopic, but after an engine has cooled off, "standing by," through a great temperature range, large negative clearance may occur. It is a feature of this invention that such large negative clearance will be completely absorbed within one cycle of the companion tappet; i. e. within a maximum of two starting revolutions of a conventional engine, all the tappets will be automatically reset to zero clearance regardless of how great the negative clearance and without requiring more interference travel of the resetting lever in the case of a large negative clearance, than with a slight adjustment requirement. This feature will facilitate starting and is absent in automatic tappets which depend on a small retrogression or creep during the lifting part of the cycle. Such action causes the valve to seat with an effective clearance equal to the amount of the creep. For example, if 3/1000 of an inch slack-off during each lift were tolerable and the valve gear acquired 15/1000″ negative clearance on standing by, it would take 5 cam cycles or 10 engine-starting revolutions to acquire zero clearance and a favorable starting condition, which may be objectionable for certain uses.

Nevertheless, according to a modification of this invention the parts may be reorganized to bring into effect other properties of a compound-wedge to effect a slight retrogression or clearance-increase responsively to the changes in valve operating loads which occur, due to changes in valve spring pressure and in inertia forces, during each valve cycle as follows:

If a body placed on a non-slipping ramp be slightly displaced sideways (at right angles to the slope) the body will acquire a component of motion down the ramp each time the displacement occurs. Thus, if the ramp member for instance of this invention should be given a slight latitude of yield, or spring, permitting the wedge to penetrate axially a small amount under increasing valve-lift loads, the compound-wedge will not recover completely when the valve-lifting load is relaxed because the motion of the wedge will not be purely axial, but it will have acquired a slight component of motion downhill of the ramp, both on the entering and recovery cycles. Such an organization will lose small increments of clearance on each lifting and closing cycle but will be reset to zero clearance by the resetting spring each time the valve rests on its seat, as previously described. In such an alternative embodiment the resetting lever may be dispensed with as shown in Figs. 6, 7 and 8 wherein an alternate form of resetting spring is also shown. This variation may be used in any environment where other parts would interfere with the resetting spring and lever shown in Fig. 1, since the parts are contained within the tappet shell.

In these figures parts similar to those of Figs. 1-5 inclusive have been identified with the same reference numerals with the addition of the subscript "a."

In this case, the ramp member 20a has a cylindrical head 22a loosely fitted inside the tappet shell 14a to provide a slight clearance shown exaggerated at 70. The stem 24a is larger in diameter than is stem 24 and has a deep axial slot 72. The wedge member 28a has a wedge angle Wa and ramp angle Ra similar to Fig. 1. Through the sides of the stem 24a are broached square holes in which is fitted the square pin 74 which anchors a spiral flat-section spring 76 having an extension arm 78 engaging a slot in the compound wedge member 28a by means of the bent end 80 Fig. 7.

In the section of Fig. 8, taken normal to the axis 7—7 of the tappet, the wedge 30a appears tapered as appropriate to the geometry of this compound wedge. A cross section taken parallel to the ramp would of course show the wedge parallel-sided.

Referring back to Fig. 6 it should be clear that, as valve operating loads increase upon the wedge 30a, the sides of the ramp member 22a will be spread and the wedge 30a will slightly descend until the clearance 70 (shown much exaggerated) is absorbed. Similarly as the valve operating loads diminish, the spring sides of stem 24a will contract urging the wedge 28a to slide upwards. As before stated any such vertical movement of the wedge will be accompanied by a lateral creep down the ramp so that the final position of the wedge at the completion of each lifting and closing cycle will be lower than at the inception of such cycle, whereby the mechanism gains a small increment of clearance during each cycle.

However, the arm 78 of the spring 76 is continually urging the compound wedge 30a up the ramp to zero clearance, which will accordingly be restored each time the valve rests on its seat, notwithstanding that clearance has been gained during the lifting and closing cycle.

While I have described my invention in detail in its preferred embodiment, it will be obvious to those skilled in the art, after understanding my invention, that various changes and modifications may be made therein without departing from the spirit or scope thereof. I aim in the appended claims to cover all such modifications and changes.

I claim:

1. A valve tappet, self-adjusting for valve clearance, comprising in combination members fitting together on V-form surfaces extending across the members on a slant, and means to adjust the clearance by moving one of said members up and down said slant.

2. In combination, a tappet and a valve-clearance adjusting wedge member thereon engaged on wedge-form surfaces extending on a slope across the tappet to comprise a compound-wedge self-locking against slipping under valve-actuating loads.

3. In combination, a tappet and a valve-clearance adjusting wedge member thereon engaged on wedge-form surfaces extending on a slope across the tappet to comprise a compound-wedge self-locking against slipping under valve-actuating loads, said wedge and tappet also having opposed spaced abutments conformed to said slope but not to said wedge whereby said wedge member slips when supported from said abutments.

4. In combination, a tappet and a valve-clearance adjusting wedge member thereon engaged on wedge-form surfaces extending on a slope across the tappet to comprise a compound-wedge self-locking against slipping under valve-actuating loads, said wedge and tappet also having opposed spaced abutments conformed to said slope but not to said wedge whereby said wedge member slips when supported from said abutments, and means there-between adapted cyclically so to support said wedge member.

5. A valve tappet and a valve clearance adjusting wedge engaged on wedge-form surfaces extending across the tappet at a slope, spring means urging said wedge up said slope toward zero valve-clearance, and means cyclically urging said wedge down said slope.

6. In combination a pair of valve tappets and valve clearance adjusting wedges engaged on wedge-form surfaces extending across respective tappets at a slope, and spring means between said wedges urging them up said slopes to zero valve clearance.

7. In combination a pair of valve tappets and valve clearance adjusting wedges engaged on wedge-form surfaces extending across respective tappets at a slope, spring means between said wedges urging them up said slopes to zero valve clearance, said tappets and wedges having spaced surfaces opposed axially of said tappets, and lever means extending into said spaces and adapted to engage either wedge as the other tappet reaches the top of its lift, whereby to unseat the respective wedge for self-adjustment on said slope when less-than-zero clearance would otherwise occur.

8. In combination a compound-wedge adjusting member for a cyclically operated valve tappet member comprising wedge-form engagement surfaces extending on a slope across said member, and spring means urging said wedge member up said slope to zero valve clearance.

9. In combination a compound-wedge adjusting member for a cyclically operated valve tappet member comprising wedge-form engagement surfaces extending on a slope across said member, spring means urging said wedges up said slopes to zero valve clearance, and means cyclically urging said wedges to creep down said slope.

10. A valve tappet and a tappet adjustment member having engagement surfaces sloping across said tappets and of wedge section transversely of said slope, and spring means urging said wedge up said slope.

11. A valve tappet having a V-section ramp thereacross, a valve clearance adjustment member fitted to said ramp, spring means urging said member up said ramp to zero valve clearance and means responsive to cyclic valve load variation on said tappet to creep said member down said ramp.

12. In a valve operating tappet a compound-wedge adjustment member engaging said tappet on a ramp of wedge section, the ramp and wedge angles being so related as to render the wedge normally self-locking against sliding down said ramp under operating loads and means organized cyclically to impart a creep of said wedge down said slope.

13. A releaseable self-locking adjustment comprising in combination, two members engaged on ramp surfaces of wedge-form cross-section, the ramp slope and wedge angles being individually non-locking, but collectively self-locking against slippage down the ramp under operating load, one member having a plane ramp land and means engageable therewith, to permit said slippage.

14. A compound-wedge adjustment comprising wedge and trough members fitted together on a slope, the wedge and slope angles being individually greater than the angle of repose, but collectively providing a self-locking engagement against slippage down the slope under operating loads, and means to relieve the wedge surfaces of load to permit such slippage.

15. A compound-wedge adjustment operable under axial loads comprising wedge and trough members fitted together on a slope greater than the angle of repose with respect to the normal to said axis, the angle of said wedge also being greater than the angle of repose, and said angles being such that the combination is self-locking against slippage down the slope under said axial load.

16. A thrust connection adjustment including in combination, members having a wedge-section engagement comprising a ramp angled with respect to the line-of-thrust to comprise a non-slipping connection under thrust, and having a ramp land transversely substantially normal to said line, and means engageable with said land to permit slippage of the adjustment.

17. An axial thrust connection including in combination, a member having a ramp of wedge-form cross-section, a compound-wedge member fitting said ramp and having a ramp land substantially normal to the axis as viewed in cross section.

18. A thrust connection adjustment comprising in combination members engaged on a ramp sloped with respect to the line-of-thrust, said engagement ramp being of wedge-form cross-section.

19. Axial thrust adjustment means including in combination members having engagement surfaces angled to form a wedge-section ramp, the ramp and wedge angles being respectively off-squareness and off-parallelism to said axis by sufficiently less than 45° to cause the members to be non-slippable down the ramp under axial loads, said members including shoulders conformed to said ramp angle and transversely off-squareness with said axis by less than 45°, and means engageable with said shoulders to relieve said wedge section ramp of axial load to permit slippage.

20. In combination, valve-lifter adjusting members including plane and wedge-form surfaces conformed to a ramp angle whereby the wedge is self-locking under valve lifting loads transmitted through said wedge-form ramp surfaces, and self-releasing under any such loads transmitted through said plane ramp surfaces and means effective to relieve any residual load by transferring the same from said wedge-form to said plane ramp surfaces.

21. In a valve-operating tappet a compound-wedge adjustment member engaging said tappet on a ramp of wedge section, the wedge and ramp angles being so related as to render the wedge normally self-locking against sliding down said ramp under operating loads, and means organized cyclically to urge said wedge down said slope.

ROLAND CHILTON.

REFERENCES CITED

The following references are of record in the file of this patent:

UNITED STATES PATENTS

| Number | Name | Date |
| --- | --- | --- |
| Re. 21,802 | Russell | May 13, 1941 |
| 1,379,165 | Burns et al. | May 24, 1921 |
| 1,790,998 | Perkins | Feb. 3, 1931 |
| 1,806,230 | Williams | May 19, 1931 |
| 2,019,792 | Nieman | Nov. 5, 1935 |
| 2,323,965 | Anglada | July 13, 1943 |